Patented Jan. 9, 1951

2,537,264

UNITED STATES PATENT OFFICE 2,537,264

COATING OR PLASTIC COMPOSITION

Aaron R. French, Atlantic City, N. J., assignor of one-third to Jack Budnick and one-third to Meyer Budnick, both of Pleasantville, N. J.

No Drawing. Application October 4, 1948, Serial No. 52,780

1 Claim. (Cl. 106—106)

The instant invention relates to a coating composition and more particularly to such a composition which may be applied by means of a spray gun or by a brush to form a protective layer for surfaces subjected to the action of the elements.

More particularly the composition of matter constituting the instant invention may be designated as a mineral paint and has as one of its primary purpose the protection against weathering, particularly the ravages of salt air, of surfaces to which it may be applied. It is contemplated to use the same as a covering on cement walls, cinder block, wall board of all types, of which sheet rock is a good example; on wood, metal, brick or stucco; and, in fact, any base surface requiring treatment for the purpose specified.

Yet another aim is the compounding of a composition of matter which may be made in either a dull or gloss finish; which if used as a white covering will not fade; which may be used on interior or exterior walls; which forms a waterproof coating protecting a wall from penetration by rain or from becoming damp; which inhibits the freezing or cracking and possible bursting of, for example, a cement surface protected thereby.

The above and other aims and objects will be apparent from the detailed description hereinafter appearing; and other advantages and uses will occur to those skilled in the art.

The first step in the preparation of the composition comprising the instant invention is the formation of a solution of magnesium chloride of a strength of approximately 30° Bé. Commercial magnesium chloride contains various impurities, including insoluble iron and manganese salts, silica, etc. Accordingly, it is purposed to dissolve the magnesium chloride in water contained in glass vessels or crocks and subject same to adequate stirring. The solution is permitted to stand for two days whereupon light materials, such as dirt and dust, will rise to the surface and may be skimmed off. Heavy and insoluble substances sink to the bottom of the container and the clear liquid is poured off by decantation or filtered to remove said insoluble compounds.

The second step comprises taking four parts by weight of magnesia or calcined magnesite; two parts by weight of potash feldspar, and two parts by weight of titanium oxide (commercially sold as titanox). These ingredients are intimately mixed, forming a dry powder, which is then sifted through a forty mesh screen. The aforementioned screened powder is now added to two quarts of the magnesium chloride solution, prepared as above, with constant stirring until a consistency approximating the thickness of heavy paint is attained, about a gallon of material being formed.

This is now allowed to stand for a half hour, after which it is again stirred and applied, within a time limit of approximately one hour, to cement walls, stucco, etc. as set out heretofore. The finished coating is of very fine grain, of great solidity, and sets very rapidly without the necessity of the application of heat. If desired, the composition may be precast in any desired manner, as in molds, and requires no baking whatsoever.

As an alternative composition three parts of magnesia or calcined magnesite, two parts of lithopone, and one part of talc or soapstone—all by weight—are intimately mixed and screened as above and if not to be used immediately kept in a dry place. This screened powder is added to two quarts of the magnesium chloride solution, all in the manner described in the two preceding paragraphs, immediately above.

Yet another additive to the magnesium chloride solution to produce a dull finish may comprise six parts magnesia or calcined magnesite, two parts of quartz and two parts asbestinite—all by weight— used in the same manner and in the same proportions as with the two previous compositions.

A good acid-resisting coating may comprise six parts magnesia or calcined magnesite and four parts of either feldspar or quartz added to the magnesium chloride solution in the same proportions and in the same manner as with the three previous compositions.

To produce a colored composition there is utilized three parts of magnesia or calcine magnesite, two parts of feldspar and one part of titanium oxide (titanox). This is compounded as heretofore described and after mixing with the magnesium chloride there may be added acid-proof colors such as iron oxide, ochre, ultramarine blue, drop black, chrome green, and others. This composition is a very good carrier of color.

Each ingredient in each of the compositions above described has a definite function. Thus the magnesia or calcined magnesite acts as a binder and hardener; the potash feldspar evens the body of the composition; and the titanium oxide unites and protects the ingredients and acts as the coloring agent.

In applying the mineral paint to a wall which is very dry and porous, said wall should first be wetted with water; and as soon as the water is absorbed and the wall has dried, the composition is applied with a soft brush or spray gun. The brush or the spray gun, whichever is used, should be cleaned frequently with water so that the coating does not set on the brush or gun. Only sufficient composition should be mixed which can conveniently be utilized in one hour. In the use of the spray gun about 45 pounds pressure is required.

Under certain conditions, and to obtain special results, other ingredients may be embodied in the aforementioned compositions either as additives or substitutes. As illustrative of these special ingredients may be mentioned clay, sawdust, chalk, ground biscuit scrap (pottery), powdered glass and the like.

From the above description, it will now be apparent that there have been disclosed coating or plastic compositions well adapted for their intended purposes. Various changes in specific details will occur to those skilled in the art. It is contemplated to cover all such and to be limited in this respect only as may be necessary by the scope of the claim hereto appended.

What is claimed is:

A coating or plastic composition comprising the following ingredients in the approximate proportions indicated:

Magnesium chloride solution (30° Bé.) 2 quarts intimately mixed with the following to form a thick paste

| | Parts |
|---|---|
| Magnesia or calcined magnesite | 4 |
| Potash feldspar | 2 |
| Titanium oxide | 2 | the last three mentioned ingredients being by weight.

AARON R. FRENCH.

REFERENCES CITED

The following references are of record in the file of this patent:

UNITED STATES PATENTS

| Number | Name | Date |
|---|---|---|
| 424,352 | Preussner | Mar. 25, 1890 |
| 1,404,438 | Holmberg | Jan. 24, 1922 |
| 1,988,125 | Kidwell | Jan. 15, 1935 |